United States Patent Office.

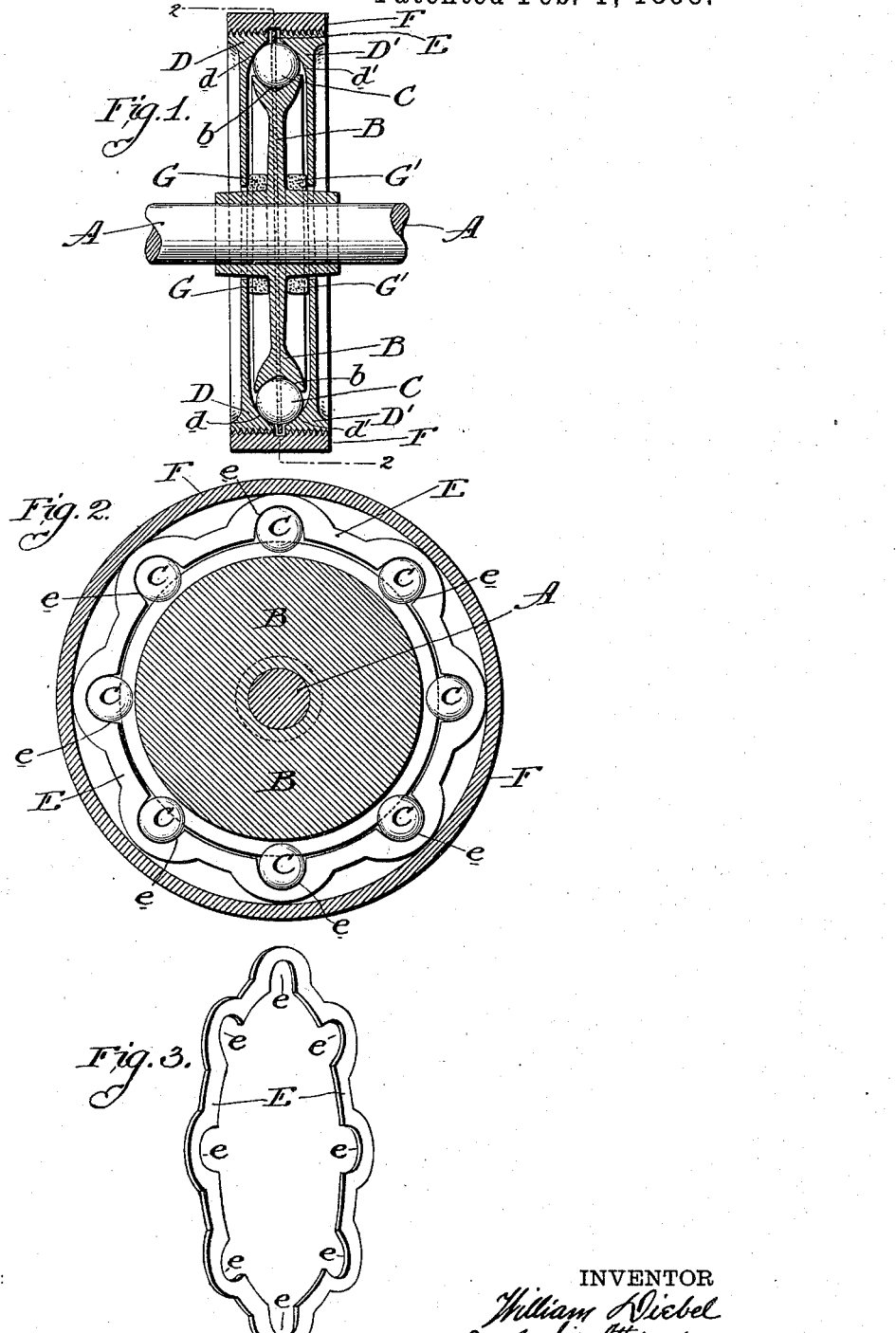

WILLIAM DIEBEL, OF PHILADELPHIA, PENNSYLVANIA.

BALL-BEARING.

SPECIFICATION forming part of Letters Patent No. 598,197, dated February 1, 1898.

Application filed August 1, 1896. Serial No. 601,316. (No model.)

*To all whom it may concern:*

Be it known that I, WILLIAM DIEBEL, a citizen of the United States, residing at Philadelphia, in the county of Philadelphia and State of Pennsylvania, have invented certain new and useful Improvements in Ball-Bearings; and I do declare the following to be a full, clear, and exact description of the invention, such as will enable others skilled in the art to which it appertains to make and use the same.

My invention relates to certain new and useful improvements in ball-bearings designed for use in connection with bicycles and other light vehicles, the present invention embodying further improvements upon an application filed by me on the 25th day of October, 1895, Serial No. 566,834, in which a single line of balls is employed in conjunction with one or more disks of comparatively large diameter, which I find in practice to work with less friction and to be more durable than the bearings commonly employed for such purpose.

My present invention aims to still further reduce the friction and to decrease the weight of the bearings, which I accomplish by reducing the number of balls in said bearings and by spacing the same by a simple device, which will be fully described hereinafter and pointed out in the claims.

In the accompanying drawings, Figure 1 represents a vertical section of a bearing constructed in accordance with my invention. Fig. 2 illustrates a transverse section taken on the line 2 2 of Fig. 1, and Fig. 3 shows a perspective view of the spacing-ring for separating the balls.

Similar letters of reference refer to similar parts throughout the drawings.

A represents a shaft or stud upon which is mounted the centrally-disposed hub of the disk B, which has formed upon its periphery a groove $b$, in which rest a number of balls C. On each side of the disk B are disks D and D', inclined at their inner surfaces at points $d$ and $d'$ to form an outer bearing for the ball C. The periphery of each of these disks is threaded and adapted to the internally-threaded portion of the framework or hanger F, although, if desired, the shaft may be stationary, and the disks D and D', together with the portion F, may be capable of rotating. Between the disks D and D' is a ring E, provided with recesses $e$ to receive the balls C. By the use of said ring the balls are properly spaced and a large amount of friction overcome, which would otherwise take place by the balls coming in contact with each other during the rotation of the same. At the same time by the use of larger-size balls I am enabled to use a smaller number, thus reducing the weight and friction, which is very desirable in light vehicles—such as bicycles, carriages, &c. These disks D and D' are for the purpose of making a dust-proof bearing. At the same time they may also serve to retain between them a quantity of oil for lubricating the working parts.

As a further protection from dust and dirt I sometimes place soft felt washers G and G' between the inner and outer disks, as shown in Fig. 1.

Having now described my invention, what I claim, and desire to secure by Letters Patent, is—

1. The combination, in a bearing, of the balls, the disk supporting said balls, and a spacing-ring encircling said disk and having recesses in its inner surface to receive said balls, as set forth.

2. A bearing for bicycles and other vehicles, comprising a central shaft, a disk mounted thereon and provided with a grooved periphery forming an inner bearing for a line of balls, an outer support having an internally-threaded portion, a pair of disks threaded upon said support and forming an outer bearing for the balls, and a ring provided with recesses to receive the balls, interposed between the inner and outer disks and the balls.

3. A single bearing for bicycles, comprising a disk of comparatively large diameter, mounted upon a central shaft and provided with a grooved periphery, outer disks, a support for said outer disks, a line of balls in the raceway formed by the inner and outer disks, and a spacing-ring provided with recesses to receive said balls.

4. The combination, in a bearing, of the disk B, having a grooved periphery forming the inner portion of the ball-race, disks, D, and D', situated on each side of the disk, B, and forming the outer portion of the ball-race, the balls, and a ring guided between the disks, D and D', said ring having a series of notches or recesses, e, for the reception of said balls.

In testimony whereof I affix my signature in presence of two witnesses.

WM. DIEBEL.

Witnesses:
J. E. CARPENTER,
D. S. WILLIAMS.